United States Patent [19]

Moore et al.

[11] 4,398,192

[45] Aug. 9, 1983

[54] BATTERY-SAVING ARRANGEMENT FOR PAGERS

[75] Inventors: Morris A. Moore, North Lauderdale; William V. Braun, Pompano Beach, both of Fla.

[73] Assignee: Motorola Inc., Schaumburg, Ill.

[21] Appl. No.: 327,308

[22] Filed: Dec. 4, 1981

[51] Int. Cl.³ .......................... H04B 5/04; H04Q 7/00
[52] U.S. Cl. .............................. 340/825.44; 179/2 EC
[58] Field of Search .................... 340/825.44, 825.37, 340/311.1; 179/2 EC, 2 EB

[56] References Cited

U.S. PATENT DOCUMENTS

| | | | |
|---|---|---|---|
| 3,582,896 | 6/1971 | Silber | 179/2 R |
| 3,725,864 | 4/1973 | Clark et al. | |
| 3,787,627 | 1/1974 | Newton et al. | |
| 3,790,717 | 2/1975 | Abramson et al. | |
| 3,919,483 | 11/1975 | Gindi et al. | |
| 4,047,162 | 9/1977 | Dorey et al. | 364/200 |
| 4,100,533 | 7/1978 | Napolitano et al. | 178/3 |
| 4,138,735 | 2/1979 | Allocca | 364/567 |
| 4,178,476 | 12/1979 | Frost | 179/2 EC |
| 4,194,153 | 3/1980 | Masaki et al. | 340/825.44 |

FOREIGN PATENT DOCUMENTS 2072908  3/1980  United Kingdom ........... 340/825.44

Primary Examiner—Donald J. Yusko
Attorney, Agent, or Firm—Margaret M. Parker; Edward M. Roney; James W. Gillman

[57] ABSTRACT

A pager or other selectively-addressed electronic device powered by a small power cell operates in four different modes and at two power levels, depending on signals received and a timing sequence. The device can stay active continuously, be activated at intervals or remain in a powered-down state. The address code assigned to a particular device would be transmitted at a predetermined time interval following a sync signal, thus the device can be powered-down until the approximate time period in which its address code could be transmitted. The system provides increased channel efficiency since information codes are superimposed on actual address codes, and there is no dead time in a channel while there are address codes waiting to be transmitted. The system is particularly well adapted to time multiplexing.

13 Claims, 7 Drawing Figures

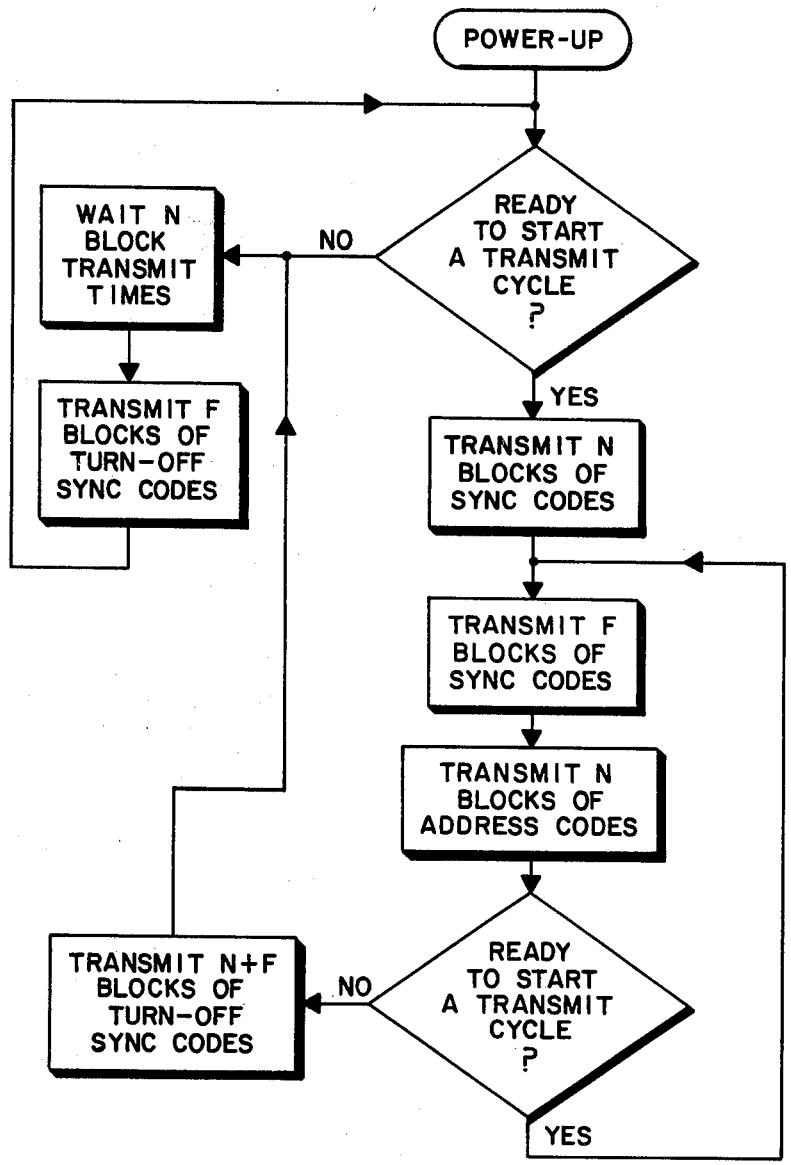

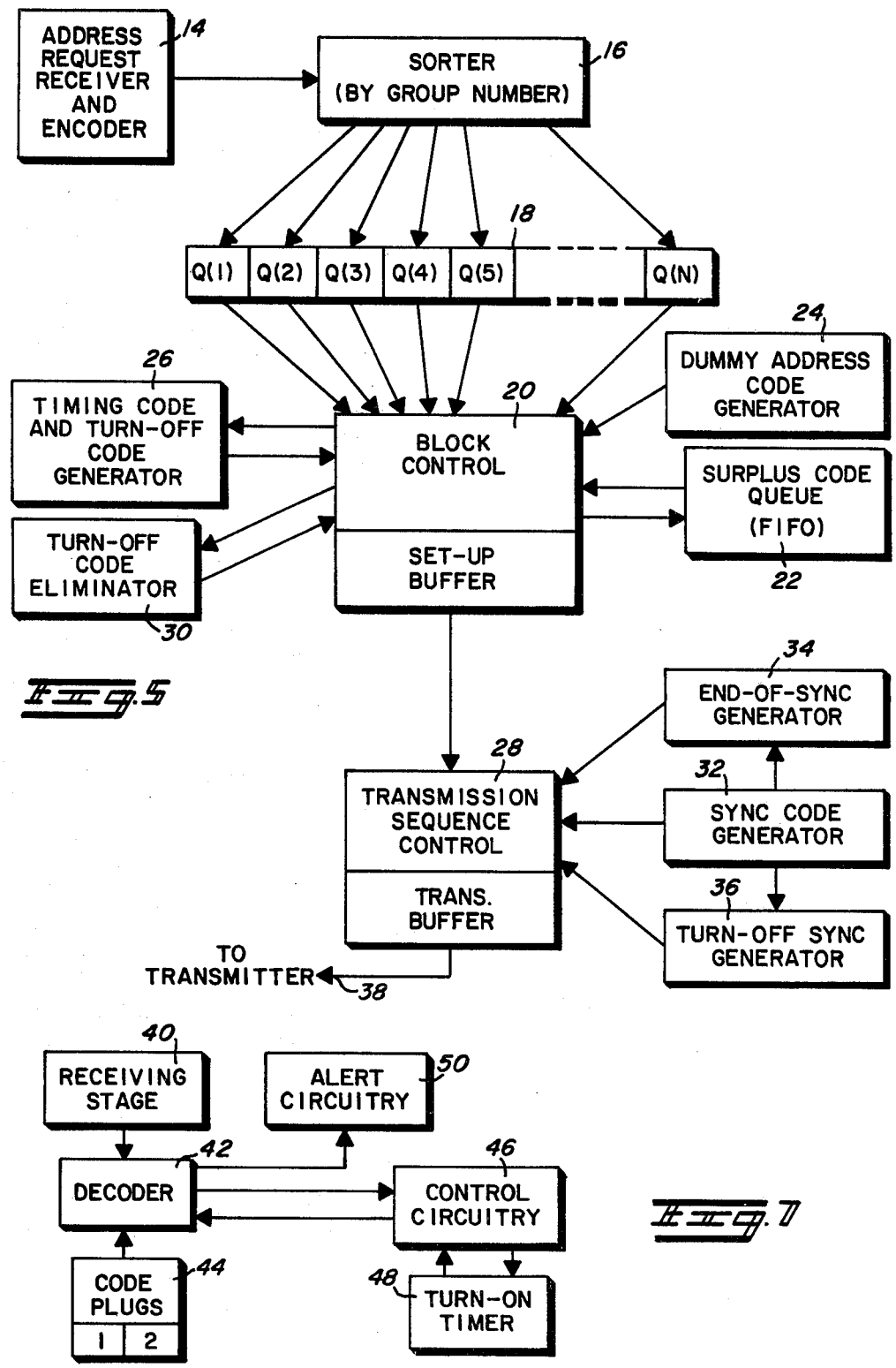

BATTERY-SAVING ARRANGEMENT FOR PAGERS

BACKGROUND OF THE INVENTION

This invention relates to the field of selectively addressable miniature battery-powered devices and, more particularly, to the provision of a power saving arrangement for such devices which also increases channel efficiency. Many schemes have been proposed for the conservation of power in small devices such as personal pagers which must be capable of receiving a signal, then detecting in that signal the address code of the pager and alerting the user. A device such as a pager must, obviously, be turned on continuously or for long periods of time. Battery drain is, therefore, a major consideration in circuit design.

The present system may be used with an address code detection system which is disclosed in U.S. Pat. Nos. 3,801,956 and 3,855,576, assigned to the same assignee as is the present invention, and which are incorporated herein by reference.

In the system of the above-referenced patents, a first address word is detected asynchronously and that detection provides automatic synchronization for a second word detect. Also included in that system is the capability of recognizing four function codes transmitted via the four combinations of the two words and their inverses. Battery-saving schemes in the prior art usually transmitted a turn-on code to the receiving unit and the unit was then turned off by an internal timer. One problem with such systems arises from the fact that, if a unit is in a low signal area when the turn-on code is transmitted, it would stay powered-down indefinitely.

SUMMARY OF THE INVENTION

It is an object, therefore, of the present invention to reduce the power required in a continuously used addressable unit, such as a personal pager.

It is a particular object to conserve power by shutting down most of the circuitry of the unit during those periods when no signals intended for that device are being transmitted.

It is another particular object to also increase channel efficiency in the system.

It is still another object to provide for automatic turn-on, even under poor signal conditions.

These and other objects are accomplished in the system of the invention by dividing the receiving units into designated groups, with each unit having a unique two-word address code, and each group having the same first address word. A particular portion of each transmission cycle is assigned to each group, including a fixed number of address code slots. Any address codes for a particular group, which had been previously stored, are transmitted before any current codes, then any stored codes for other groups are put into any unused address code slots. Each group of units remains active until an encoded address code is received, signifying that no more address codes for that group are to be sent in that transmission cycle. The unit then powers down until time for its portion of the next transmission cycle.

BRIEF DESCRIPTION OF THE DRAWING

FIG. 4 is a flowchart for a portion of the transmitter function.

FIG. 5 is a block diagram of a portion of the transmitter.

FIG. 7 is a block diagram of a receiving unit.

DETAILED DESCRIPTION OF A PREFERRED EMBODIMENT

For ease of understanding, the present invention will be described with reference to a particular system, namely, a paging system including the address decoding scheme disclosed in the U.S. Pat. Nos. 3,801,956 and 3,855,576, referred to hereinabove. However, the invention is not to be construed as limited to this system or to pagers.

Figure 1:
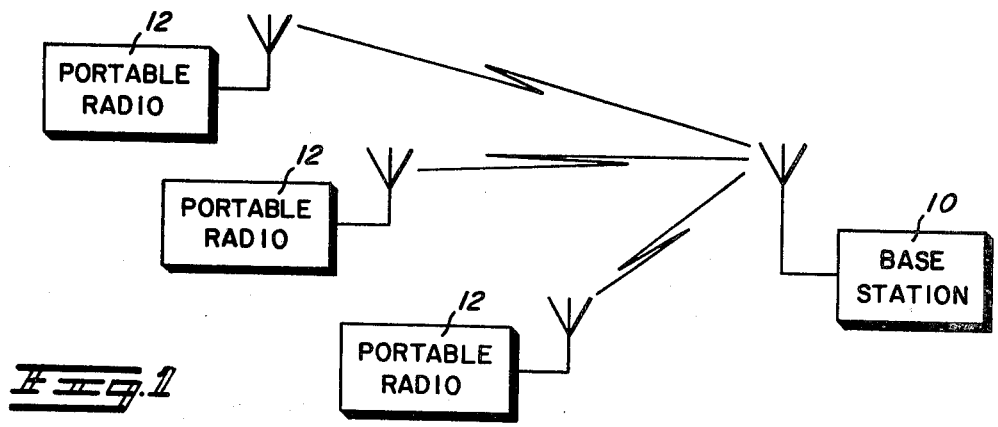
FIG. 1 is a representation of a system such as could utilize the present invention.

As seen in FIG. 1, a wired or wireless system would include a base station or transmitter 10 with a plurality of receiving units such as personal pagers 12. Each unit 12 will be able to detect two address codes (not simultaneously), one a unique individual code and the other a synchronizing code common to all units, with one exception which will be discussed below.

The transmitter 10 will either receive a number of address requests or will generate requests for various ones of the battery-powered units 12. If the units 12 are pagers, they will be quite small, typically carried in a shirt pocket or clipped to a pocket or belt. To be fully utilized, each unit must be turned on for hours at a time, even around the clock. Although the battery drain is small even when the unit is fully powered, it is still highly desirable to reduce the drain to a minimum, thus reducing down time due to battery failure. In the present arrangement, each unit is fully powered only periodically during the "standby" and "sync seeking" modes of operation. It is continually powered in the active "receiving" mode and is powered-down for a timed period in the "battery-saver" mode. Mode switching is controlled by coding on received address and synchronizing codes and by an internal timer.

Figure 2:
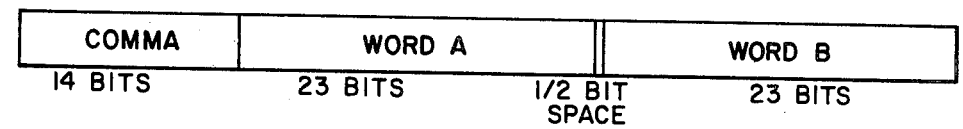
FIG. 2 is a diagram of one address code format.

The address codes will each consist of two words, preferably in the format of FIG. 2. As described in the two patents referred to above, word A may be detected asynchronously and word B synchronously (referenced from the word A detection), and the unit must be capable of detecting the inverse of the address words. The individual address codes in a system will be divided into N groups, and each unit in a given group n will have the same word A. The second code, to be known as the sync code, will be common to all units in the system. The only exception to this being that, in a time multiplex system, two entirely different groups of receiving units may be multiplexed by using a different sync code. It is to be understood that the format of FIG. 2 is only a preferred embodiment, and that the present invention could apply to address code formats varying considerably from the illustrated one.

Figure 3:
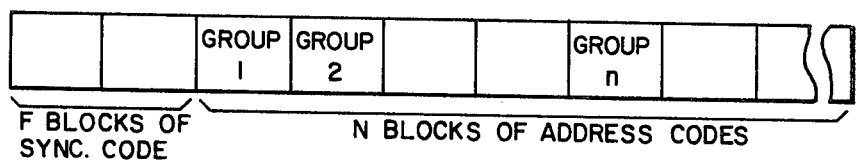
FIG. 3 is a diagram of a normal transmission cycle.

As seen in FIG. 3, each one of the N groups of address codes is assigned a fixed and definite portion or block of the normal transmission cycle and, usually, all address codes for a given group n will be transmitted within that block. The normal cycle will also include F blocks of sync codes, preceding the first block of address codes. In one embodiment, F is two and N is fifty.

FIG. 4 shows the operation of the transmitting control unit in flowchart form, starting with power-up and also includes a chart of address and sync codes. If all conditions are such that transmission should begin, N blocks of sync codes will be transmitted in order that all receiving units will be fully operational and synced in time to receive a possible address code during the appropriate block of codes. The (N+F) blocks of sync codes allow time for all the receiving units to be synced, regardless of their individual operational mode at the initiation of transmission. Letting $A_S$ and $B_S$ be the words of the normal sync code, the last sync code in the F blocks of sync codes will be $A_S$, $\overline{B_S}$, the "end-of-sync" code. Detection of this code provides a timing reference for each unit. All but one group of units will then be powered-down; i.e., will go into the battery-saver mode (see FIG. 6) until just before the beginning of transmission of the block assigned to that unit's group. Obviously, the first group of units will remain on. Next, the N blocks of address codes is transmitted and, until there is a contraindicating condition, the normal cycle is repeated continuously from then on. If, however, the normal cycle is to be interrupted, N+F blocks of turn-off sync codes ($\overline{A_S}$, $\overline{B_S}$) are transmitted, then there is a pause for N block transmission times, followed by F blocks of turn-off sync codes. This cycle brings a return to the initial power-on point and another transmit/not transmit decision. One possible reason for this "turned-off" period could be time multiplexing, another would be very low demand for addressing or paging, as at night. This latter condition could be determined by counting the total number of address codes stored in a memory (see FIG. 5). If the transmitter had to be shut down for repair, the units would be put into "standby" mode in this fashion and the transmitter could be shut down after transmission of at least the N+F blocks of turn-off sync codes.

FIG. 5 is a block diagram of a portion of the transmitting unit 10 which controls the formation of the N blocks of address codes in the transmission sequence of FIG. 3. An address request receiver and encoder 14 receives requests for accessing the units 12 and channels these requests to sorter 16, which sorts by group number 1—N, and these requests are then stored in N memories 18. The access requests may arrive by any appropriate means such as phone lines, or may be generated by the unit 10. They may arrive in the binary address form or may require encoding to that form. The buffer in the block control/set-up buffer 20 is empty at the beginning of each address code transmission block. Consider now the case of group n. Any unit address codes from group n which were left over from previous transmission cycles have been stored in the surplus code queue 22. Address codes received since the last cycle are stored in the n group portion of the memory 18. Address codes are stored in the queue 22 on a first-in/first-out basis, with one exception as will be explained hereinafter. When the normal transmission cycle has reached the point of transmitting address codes for group n, a block of M "group n" address codes (M being 5 in one embodiment) any group n address codes up to the number M, which had been stored in the surplus code queue 22, are now put into the front of the set-up buffer 20. If space remains in the buffer 20, newly received address codes are added from the group memory 18, to provide a total of M address codes. A minimum of two address codes are necessary for function coding purposes. If there are now less than two address codes in the set-up buffer, dummy address codes from a dummy address code generator 24 are added to the set-up buffer to make a total of two. A dummy address code is merely an unassigned unit address code. The first address code now in the set-up buffer will then be coded as a timing code, and the last address code is coded as a turn-off code. This coding is accomplished by routing the address code through a timing code and turn-off code generator, where the first address word is inverted, $A_n$, $B_m$ thus becoming $A_{ns}$, $B_m$. If more than M address codes for group n were in the combined storage of the queue 22 and the group n portion of the memory 18, no turn-off code will be transmitted, and group n units will continue to listen for address codes in subsequent transmission blocks. If less than M address codes are now in the set-up buffer 20, the oldest address codes in the surplus code queue 22, likely from group (n+1), (n+2), etc., will be added to bring the total in the set-up buffer to M. The only exception to the first-in/first-out rule for the queue 22 occurs when, by the time of the next group n transmission, address codes of other groups are ahead of any group n codes in the queue, group n codes would be pulled out of sequence for the transmission block allocated to group n. In some applications, the set-up buffer may have the capability of storing more than M address codes, in which case only the first M address codes would be coupled to a transmitter buffer/control 28, and the remaining address codes would be sent to the back of the queue in the surplus code queue 22, with any turn-off code removed by a turn-off code eliminator 30. The turn-off code eliminator 30, of course, functions much as does the generator 26, reinverting the first word.

A sync code generator 32 provides a sync code $A_S$, $B_S$ having the same format as an address code and which is also coupled to an end-of-sync generator 34 and a turn-off sync generator 36. The generators 34 and 36 also perform an inversion function, thus the end-of-sync code is $\overline{A_S}$, $\overline{B_S}$ and the turn-off sync is $A_S$, $\overline{B_S}$. Referring back to FIG. 4, the end-of-sync code is the last code in the F blocks of sync codes in the normal transmission cycle. The end-of-sync code provides an exact timing reference point which allows each unit to set its own turn-on timer 48 (see FIG. 7) to cause the unit to switch from the battery-saver mode to the receive mode at the proper time to receive the block of n group codes. It should be noted here that the set-up buffer 20 and transmitter buffer 28 could be one buffer in which the complete transmission sequence is prepared. In either case, the sequence is coupled to whatever transmission means is employed in the system.

Figure 6:
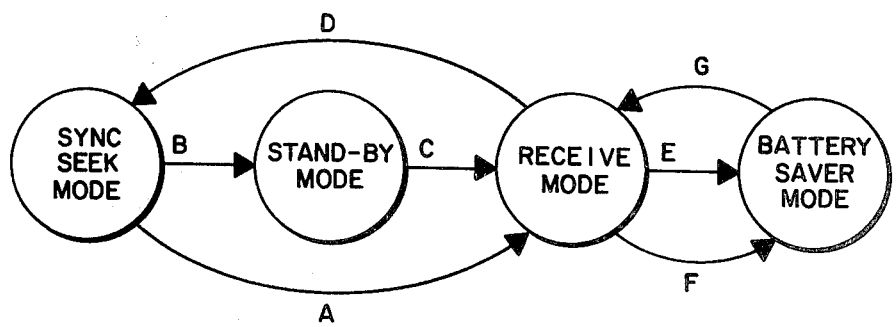
FIG. 6 is a diagram of the operating modes of the battery-powered receiving unit.

The diagram of FIG. 6 indicates the four operational modes of the small battery-powered units, as pagers, and the possible changes of state. In the receive mode, the unit is fully powered continuously. In the battery-saver mode, only those portions of the circuitry are powered which are necessary to initiate a change of state at the proper time and, if necessary, to avoid loss of data stored in the unit's memory. In the sync-seek mode, the unit is activated often enough to ensure detection of at least one of the MxF sync codes sent at the beginning of each normal transmission cycle. If a normal sync code is detected, the unit stays on, looks for the end-of-sync code and, upon that detection, takes a reference point for its timer and turns off again until time for its particular block of address codes. When the timing period expires, the unit goes into the receive mode, line A. If a turn-off sync code is detected, the unit is switched to the standby mode, line B. In the standby mode, the unit is activated often enough to ensure detection of at least one of the M (N+F) sync codes which are sent at the end of a period of inactivity (MxF of these sync codes are a part of the normal transmission cycle). When the end-of-sync code is detected, the unit turns off again until time for its own block of address codes when it switches to the receive mode, line C. Once in the receive mode, the unit is continuously powered, but if no timing code is received within a fixed period after entering the receive mode (for example, 1.5 address code transmit periods) the unit would return to the sync-seek mode, line D. This situation could occur under very poor signal reception conditions. Thus, the unit is enabled to regain synchronization after loss of signal. If a timing code is detected within the detection window, the timer is set to determine the next entry into the receive mode. The period of the timer here is one normal page cycle, but the "on" time is determined by the location of the turn-off code for group n. The unit times its return to receive mode from the timing code rather than the turn-off code since the position of the timing code in the sequence is fixed. The turn-off code, on the other hand, may occur at its normal position or at any point thereafter when all group n address codes have been removed from the surplus code queue 22. No slots in the transmission sequence are wasted if there are address codes to be transmitted and no slots in the address code blocks are used up by function commands, thus increasing channel efficiency considerably.

If the address code for a particular unit is detected in the block of n group codes, the appropriate circuitry is activated and, in the case of a pager, an alert is given to the user. The unit also begins to look for the turn-off code, which indicates that no more address codes for that unit's group are to be transmitted during that transmission cycle and, upon that detect, the unit goes to battery-save moder, line E. If an end-of-sync code is received but the turn-on timer period has not expired, the unit will turn off, line F, until the period has expired. Since this means that address codes for group n are now to be transmitted, the unit returns to the receive mode, line G.

FIG. 7 is a block diagram of a receiving unit, such as a pager. In a receiving stage 40, incoming signals are detected in any fashion appropriate to the system. In a decoder 42, which may be similar to those in the above-referenced patents, the detected signals are decoded and matched against the codes stored in code plugs 44. These are the unique address code for the unit and the sync code for the units in the particular system or subset. The decoder 42 has the capability of recognizing, not only the exact counterparts of the stored codes, but codes having one or both code words inverted. The switching function, as described hereinabove, is provided by relatively simple logic elements in control circuitry 46 and by a timing circuit (turn-on timer) 48. When the address code of a unit is detected, a signal is coupled to an alert circuitry 50 for providing an alert to the user. It will be recognized that the alert circuitry would, in other than pager applications, be replaced by the appropriate circuitry.

Thus, there has been shown and described a battery-saving arrangement for selectively addressable devices which includes a specific sequence of address codes and synchronizing codes which provide for minimum power drain in the receiving units, and increased channel efficiency for the transmitting unit. Other variations, and modifications to many communications systems, are possible and it is intended to cover all such as fall within the spirit and scope of the appended claims.

What is claimed is:

1. A battery-saving arrangement for selectively addressable devices and comprising:

transmission means including first means for receiving two-word binary address codes, means for transmitting a sequence of binary signals, means coupled to the receiving means for sorting the received address codes according to predetermined groups of devices, first memory means coupled to the sorting means for storing the sorted address codes by groups, block control means coupled to the first memory means for assembling ones of the sorted and stored address codes into transmission blocks, second memory means coupled to the block control means for storing a first predetermined number of address codes of one of the respective groups of device address codes, first coding means coupled to the block control means for further encoding predetermined ones of the address codes stored in the second memory means, first generator means for generating two-word synchronizing code signals, said synchronizing codes having the same format as the address codes, and including second coding means for selectively further encoding selected ones of the synchronizing code signals, transmission sequence control means coupled to the block control means and to the first generating means for assembling blocks of address codes and synchronizing codes into a sequence and coupled to the transmission means for transmission; and a plurality of selectively addressable devices, each device including means for receiving the transmission sequence, means for detecting one of the address codes, all of the further encoded address codes and all synchronizing codes, when said codes appear in the transmission sequence, and means for responding to the detection of said one address code.

2. A battery-saving arrangement in accordance with claim 1 wherein the first coding means selectively inverts at least one word of an address code.

3. A battery-saving arrangement in accordance with claim 1 wherein the second coding means selectively inverts at least one word of the synchronizing code.

4. A battery-saving arrangement in accordance with claim 1 and further including second generator means for providing an additional address code when less than a second predetermined number of address codes of one group is stored in the combined first and second memory means, the second predetermined number being not greater than the first predetermined number and not less than two.

5. A battery-saving arrangement in accordance with claim 4 wherein the block control means couples the first address code in each block through the first coding means.

6. A battery-saving arrangement in accordance with claim 5 and wherein the block control means couples the last address code of the address codes of one predetermined group in the combined first and second memories through the first coding means.

7. A battery-saving arrangement in accordance with claim 1 and wherein the sequence includes a normal transmission cycle including a third predetermined number of blocks of synchronizing codes followed by a fourth predetermined number of blocks of address codes, the fourth predetermined number being the number of predetermined groups of devices.

8. A battery-saving arrangement in accordance with claim 7 and wherein the transmission sequence control means couples at least one of the synchronizing codes in each normal transmission cycle from the second coding means for providing a first encoded synchronizing code.

9. A battery-saving arrangement in accordance with claim 8 and wherein the transmission sequence control means couples synchronizing codes from the second coding means for providing blocks of second encoded synchronizing codes in addition to the normal transmission.

10. A battery-saving arrangement in accordance with claim 9 and wherein the blocks of second encoded synchronizing codes are coupled to the transmission means when less than a fifth predetermined number of address codes is stored in one of the first and second memory means.

11. A battery-saving arrangement in accordance with claim 1 and wherein the detecting means of the selectively addressable devices include means for detecting inversions of the words in the address codes and the synchronizing codes, each device further including means for responding to the inverted code words.

12. A battery-saving arrangement in accordance with claim 11 and wherein the addressable devices further include timing means responsive to the synchronizing codes and to address codes having inverted words.

13. A battery-saving arrangement in accordance with claim 1 and wherein the transmission means further includes third memory means coupled to the block control means for storing received address codes in excess of the first predetermined number, and placing said codes in a first-in/first-out queue, and wherein address codes stored in the third memory means are coupled to the second memory means in advance of address codes stored in the first memory means.

* * * * *